US010263994B2

(12) United States Patent
Roth et al.

(10) Patent No.: US 10,263,994 B2
(45) Date of Patent: *Apr. 16, 2019

(54) AUTHORIZED DELEGATION OF PERMISSIONS

(71) Applicant: Amazon Technologies, Inc., Reno, NV (US)

(72) Inventors: Gregory B Roth, Seattle, WA (US); Bradley Jeffery Behm, Seattle, WA (US)

(73) Assignee: Amazon Technologies, Inc., Seattle, WA (US)

( * ) Notice: Subject to any disclaimer, the term of this patent is extended or adjusted under 35 U.S.C. 154(b) by 165 days.

This patent is subject to a terminal disclaimer.

(21) Appl. No.: 14/817,194

(22) Filed: Aug. 3, 2015

(65) Prior Publication Data

US 2015/0341368 A1 Nov. 26, 2015

Related U.S. Application Data

(63) Continuation of application No. 13/614,867, filed on Sep. 13, 2012, now Pat. No. 9,098,675.

(51) Int. Cl.
| | |
|---|---|
| *G06F 7/04* | (2006.01) |
| *G06F 15/16* | (2006.01) |
| *G06F 17/30* | (2006.01) |
| *H04L 29/06* | (2006.01) |
| *G06F 21/00* | (2013.01) |
| *H04L 29/08* | (2006.01) |
| *G06Q 50/00* | (2012.01) |
| *H04L 9/32* | (2006.01) |

(52) U.S. Cl.
CPC ............ *H04L 63/102* (2013.01); *G06F 21/00* (2013.01); *H04L 63/08* (2013.01); *H04L 63/0884* (2013.01); *G06F 2221/2115* (2013.01); *G06Q 50/01* (2013.01); *H04L 9/3263* (2013.01); *H04L 67/20* (2013.01)

(58) Field of Classification Search
CPC ...................................................... G06F 21/00
USPC ...................................................... 726/4, 27
See application file for complete search history.

(56) References Cited

U.S. PATENT DOCUMENTS

2004/0260952 A1* 12/2004 Newman ................. G06F 21/10
726/6
2005/0044138 A1* 2/2005 Albert ................... G06Q 20/102
709/203

(Continued)

*Primary Examiner* — Jeffrey C Pwu
*Assistant Examiner* — Samuel Ambaye
(74) *Attorney, Agent, or Firm* — Hogan Lovells US LLP

(57) ABSTRACT

Systems and methods are described for delegating permissions to enable account access to entities not directly associated with the account. The systems determine a delegation profile associated with a secured account of at least one customer. The delegation profile includes a name, a validation policy that specifies principals which may be external to the account and which are permitted to assume the delegation profile, and an authorization policy that indicates the permitted actions within the account for those principals which are acting within the delegation profile. Once the delegation profile is created, it can be provided to external principals or services. These external principals or services can use the delegation profile to obtain credentials for performing various actions in the account using the credentials of the delegation profile.

15 Claims, 7 Drawing Sheets

(56) References Cited

U.S. PATENT DOCUMENTS

| | | | | |
|---|---|---|---|---|
| 2007/0204016 | A1* | 8/2007 | Kunz | G06Q 10/06 709/223 |
| 2008/0313282 | A1* | 12/2008 | Warila | G06F 8/24 709/206 |
| 2009/0328178 | A1* | 12/2009 | McDaniel | G06F 21/31 726/9 |
| 2010/0107225 | A1* | 4/2010 | Spencer | H04L 63/0876 726/4 |
| 2010/0125894 | A1* | 5/2010 | Yasrebi | H04L 12/2818 726/4 |
| 2010/0319068 | A1* | 12/2010 | Abbadessa | H04L 63/08 726/21 |
| 2012/0311671 | A1* | 12/2012 | Wood | H04L 63/08 726/4 |
| 2012/0324242 | A1* | 12/2012 | Kirsch | G06Q 20/0855 713/189 |

* cited by examiner

AUTHORIZED DELEGATION OF PERMISSIONS

CROSS REFERENCE TO RELATED APPLICATIONS

This application is a Continuation of allowed U.S. patent application Ser. No. 13/614,867, entitled "Authorized Delegation of Permissions," filed with the U.S. Patent and Trademark Office on Sep. 13, 2012, which is incorporated herein by reference for all purposes.

BACKGROUND

In recent years, an ever increasing number of applications and services have been made available over networks such as cellular networks and the Internet. Due to this, an increasing number of content and service providers are turning to technologies such as remote resource sharing and cloud computing. Cloud computing, in general, is an approach to providing access to electronic resources through services, such as Web services, where the hardware and/or software used to support those services is dynamically scalable to meet the needs of the services at any given time. A user or customer of a service provider will typically rent, lease, or otherwise pay for access to resources through the cloud, and thus does not have to purchase and maintain the hardware and/or software to provide access to these resources.

In this context, a large number of security concerns are faced by service providers and by their customers. Typically, the service provider wants to ensure that the resource infrastructure is secure and that their customers' services and data are protected. Similarly, the customer of the service provider needs to ensure that the provider has taken the proper security measures to protect their information against unauthorized use or access from end users or various other parties. Furthermore, in some cases, the customer may wish to delegate or share security privileges between multiple heterogeneous services and resources that reside within the service provider or in external networks. It is thus desirable to enable the customer to achieve such sharing of privileges in a trusted and secure manner.

BRIEF DESCRIPTION OF THE DRAWINGS

Various embodiments in accordance with the present disclosure will be described with reference to the drawings, in which.

DETAILED DESCRIPTION

Figure 1:
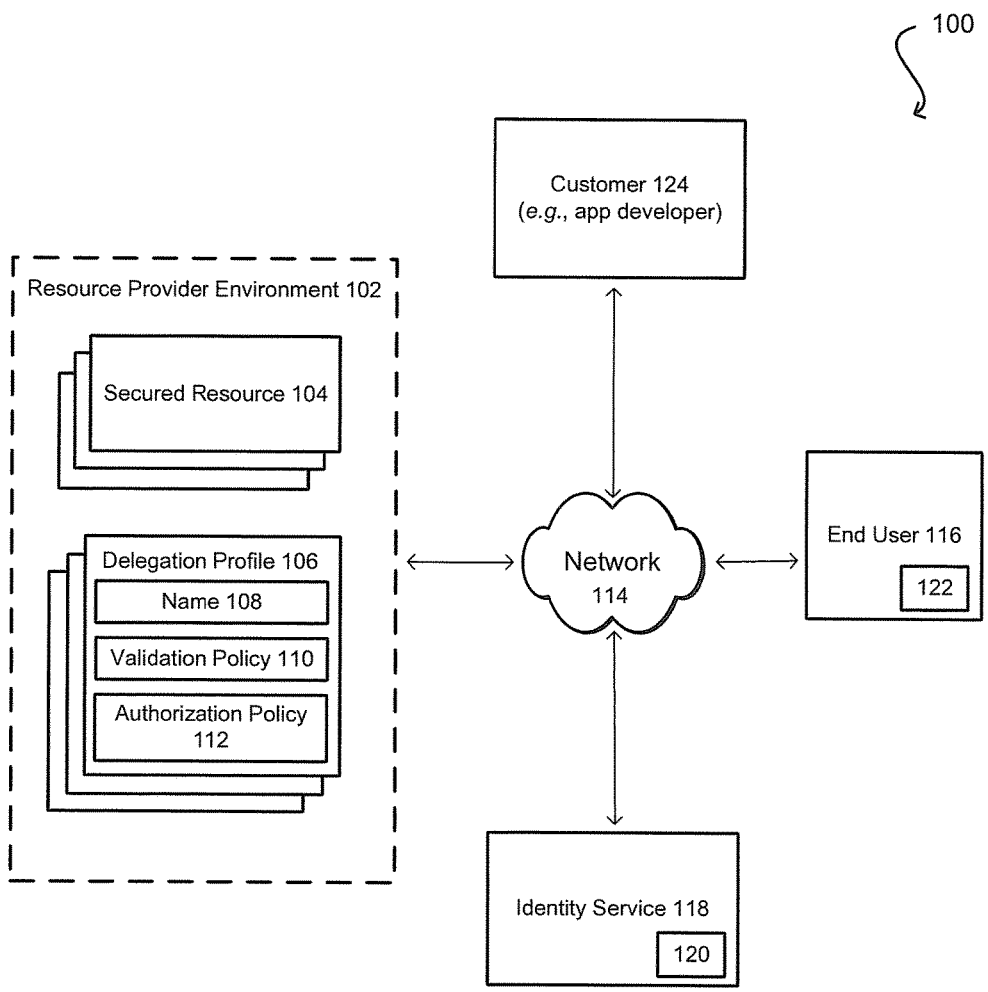
FIG. 1 is a high level illustration of an environment including a delegation profile entity configured to determine and delegate permissions, in accordance with various embodiments.

In the following description, various embodiments will be illustrated by way of example and not by way of limitation in the figures of the accompanying drawings. References to various embodiments in this disclosure are not necessarily to the same embodiment, and such references mean at least one. While specific implementations and other details are discussed, it is to be understood that this is done for illustrative purposes only. A person skilled in the relevant art will recognize that other components and configurations may be used without departing from the scope and spirit of the claimed subject matter.

Systems and methods in accordance with the embodiments described herein overcome the various deficiencies in existing approaches for delegating security rights and privileges for services and resources in an electronic and/or multi-tenant environment. In particular, the various embodiments provide approaches for using an internal and/or external entity to dynamically determine and authorize delegation of permissions to perform actions in, on, or against a secured account.

In accordance with various embodiments, a resource provider system can utilize a set of delegation profiles that can be created, selected, or applied for one or more accounts of at least one customer, where each customer has at least some level of access to one or more resources managed and/or offered by the system. In accordance with an embodiment, a delegation profile can include information such as (a) a name (or other identifier), (b) a validation policy that specifies one or more security principals (e.g., end users), or types of security principals, which may be external to the account and which are permitted to assume the delegation profile, and (c) an authorization policy specifying the permitted actions within the account for principals which are acting within the delegation profile. In some situations, a customer of the resource provider system might specify one or more policies, rules, or other criteria that can be evaluated to determine which delegation profile to apply to a specific principal, or to a request from that principal, etc.

Once a delegation profile has been created and assigned to a customer account, permission can be granted to the customer to use the delegation profile for enabling access to the respective resource(s). Thereafter, the customer can use the delegation profile by providing references to the delegation profile to external entities, such as end users or external services, or the customer can provide policies or rules that can be used to determine that the profile should be used for those end users or services. If an external entity is provided with a reference to the delegation profile, the entity can use the reference to obtain a set of credentials for performing certain actions in the account. For example, an end user can submit a request for credentials to an identity service, such as a security token service, where the request includes a reference to the delegation profile. The security token service can verify whether the end user is one of the security principals that were specified in the validation policy of the delegation profile. If the user was specified as a security principal, the security token service can provide the end user with a set of credentials. These credentials enable requests to be made within the security context of the delegation profile in the account, subject to the permissions that were specified in the authorization policy. If the end user was not provided with a reference to a delegation profile, the end user can submit a request without the reference and information included in the request can enable a determination of the proper delegation profile to apply. The determination can include, for example, performing a lookup based at least in part upon one or more aspects of the request and/or based at least in part upon one or more aspects of the end user. In some embodiments, the end user can be identified by a security service or federation provider indicated by the delegation profile. In other embodiments, the delegation profile can include a reference to a security service or other authority that is capable of identifying the users, or types of users, for which that delegation profile should be utilized. In some embodiments the permissions can be determined in accordance with one or more rules that map attributes asserted by the security service or other authority to one or more permissions elements.

In accordance with various embodiments, a delegation profile can be created or otherwise obtained, and associated with an account for a customer of a service provider environment or system. The service provider can provide network-accessible services (e.g., Web Services), and in at least some embodiments the account can be associated with a set of resources and principals that can use those resources. The account is secured such that access to the resources of the account is controlled and restricted to authenticated principals associated with, or including, the customer. The delegation profile thus encapsulates the grant of permission to a particular entity or set of entities (e.g., end users) to perform actions on the resources of the account while operating under the credentials of the delegation profile. This grant may span across multiple accounts of the service provider. In addition, the delegation profile may be used in a single service provider or between multiple service providers. The delegation profile can be used to delegate permissions between a plurality of services that are components of a distributed system.

In accordance with an embodiment, a person authorized by the top level identity creates a delegation profile in the account and specifies a name for the profile, a validation policy (granting access to external services or identities), and a set of capabilities for the users (i.e., external services or identities) that will be using the profile. The person can also set forth one or more policies, rules, or other criteria for determining the type(s) of users or requests that should be associated with a particular delegation profile.

External entities or entity types named in the validation policy can use a determined delegation profile to allow those entities to act as authorized users of the customer account, subject to the restrictions of the delegation profile. The delegation profile in some embodiments can be treated as a resource that is passed to calls that create entities and authorization of the caller is performed by the external service.

In situations where the appropriate customer cannot be determined directly from the request, contextual information from the customer and/or the identity service can be used to determine the customer resources, policies, and profiles to be used for the end user request. This information can include, for example, the application the user signed into, information in the navigational link, a certificate used to sign the request, or other such information.

FIG. 1 is a high level illustration of an environment 100 in which one or more delegation profiles can be selected and/or dynamically determined to enable a customer to delegate permissions to one or more end user devices or other external entities, in accordance with various embodiments. As illustrated, a resource provider environment 102 can include one or more secured resources 104 of various types, as may be used to support various services and/or applications. These resources can include physical and/or virtual resources, such as application or data servers or server instances, among other such resource types. A customer 124 of the resource provider environment 102 can obtain an account with the resource provider environment, enabling the customer 124 to access one or more of the secured resources 104 across at least one appropriate network 114. The customer in some embodiments can utilize these resources to support applications and services that might be utilized by one or more external entities 116, such as end users of those applications and services.

When an account is created for the customer, at least one delegation profile 106 can be created or otherwise associated with the account for the customer. The account is maintained by the resource provider environment on behalf of the customer, and the account can designate one or more principals of the customer 124 and a set of the shared resources (e.g., 104) that those principals can access and use. The delegation profile 106 can be created or selected by an authorized user (e.g., an administrator) associated with the account and/or customer. In accordance with an embodiment, an example delegation profile 106 includes a name 106 or identifier, at least one validation policy 110, and at least one authorization policy 112. The name 108 can be a string or any other identifier that is used to refer to the delegation profile. The validation policy 110 specifies which security principals, external entities, or other types of users are allowed to utilize the delegation profile to perform various actions on resources under the delegation profile. As discussed, the external entities or other can reside externally with respect to the customer and/or the account. In addition, the one or more authorization policies 112 can indicate which specific actions the various principals, entities, or users are allowed to perform (e.g., run instances, read or modify data, access other secured resources in the account etc.).

In accordance with an embodiment, a customer 124 associated with an account is able to provide the delegation profile to an external entity 106, such as an end user or a service. For example, the customer 124 may provide a reference to the delegation profile to the external entity 116. The external entity 116 can then obtain credentials 122 to act as an authorized user under the account by way of the delegation profile 106. For example, the external entity 116 may use the reference to the delegation profile 106 and request the credentials 122 from a security service 116, federation system, or other authorized entity that has access to a copy of the credentials 120. The security service (or other identity or federation management entity) can verify whether the validation policy defined in the delegation profile properly identifies the external entity 116 as being allowed to assume the delegation profile. If the external entity 116 is verified, the security service can issue the set of credentials 122 that can be used by the external entity to perform actions on resources 104 associated with the account, subject to the permissions specified in the authorization policy 110.

In this manner, customers are able to provide the delegation profile to various external entities (e.g., users, services, applications, etc.), and if those entities have been properly identified as security principals in the validation policy of the delegation profile then the entities are able to act in the account. This enables external entities to perform various actions on resources in the account which have been granted to them by the authorization policy, all without the need to make those external entities actual users of the account. This can provide a more efficient control model over the actions and actors that are able to access the resources of the account under the assumption of the delegation profile.

Figure 2:
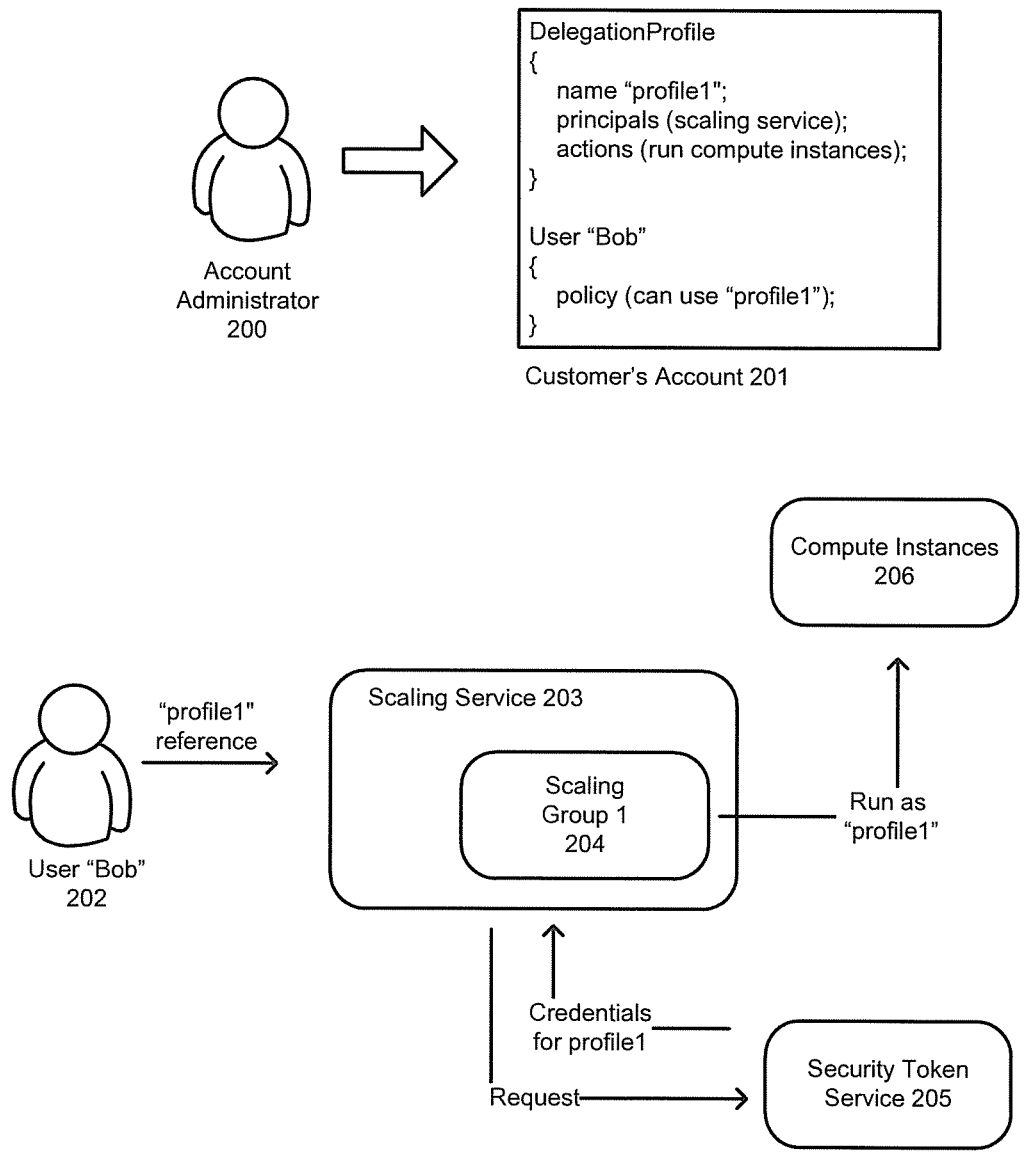
FIG. 2 is an example illustration of using the delegation profile with a customer's account, in accordance with various embodiments.

FIG. 2 is an example illustration of using the delegation profile with a customer's account, in accordance with various embodiments.

As an illustration, an administrator 200 of a customer's account 201 may create a delegation profile named "profile1" with a validation policy that grants access to an automatic scaling service (i.e. security principal) to assume the delegation profile. By way of example, the scaling service may be responsible for adding or removing resources to the customer's account 201 depending on demand for compute or storage capacity. When the customer of a service provider needs more computing resources due to an increase in traffic or workload, the automatic scaling service may automatically add compute instances to meet the traffic demand. Similarly, when some of the customer's leased resources are sitting idle and unused, the scaling service can automatically reduce the number of compute instances allocated to the customer.

In accordance with the illustrated embodiment, the delegation profile further includes an authorization policy that specifies a set of permissions for the scaling service to perform. In this particular example, the specific action that is permitted is to "run compute instances" under the delegation profile in the customer's account. However, in alternative embodiments, the action can be any action that can be performed in connection with the account 201, such as accessing data, modifying resources, executing services and the like.

Once the delegation profile has been created, the administrator may grant the use of the profile to user of the account named "Bob" such as by including a statement "profile: useprofile" under Bob's identity in the account. After the user Bob 202 has been granted the right to use the profile, Bob 202 may invoke the scaling service 203 to create a scaling group "Group1" 204 (or any other resource modeled within the scaling service), passing in the unique identifier of "profile1" as an argument to the scaling service 203. For example, the scaling group "Group1" 204 may be a resource modeled within the scaling service that is associated with a group of specific computing instances that should be managed (i.e. expanded or shrunk in number) by the scaling service. Another example of a resource modeled within a service may be code running on a computing instance that may need to invoke a resource in the account acting under the guise of the delegation profile.

Upon receiving the request from the user 202, the scaling service 203 could check whether user Bob 202 has permissions to perform the action "profile:useprofile" on "profile1" and create the appropriate group for the user.

Subsequently, when the scaling group 204 needs to take actions on the account 201, the scaling service 203 may create a credential for the scaling group 204 by passing a reference to "profile1" to an identity management service 205. The identity management service can be any security entity that can verify the validation policy and authorization policy of the delegation profile. In accordance with an embodiment, the scaling service 203 would then use the resulting credential to represent the scaling group 204. All subsequent actions taken on the customer's account can be performed by the scaling group "Group1" 204 which is an entity within the customer's account. In some cases, the customer's group may need to have permissions to take all actions within the account that are necessary, like launching compute instances.

Figure 3:
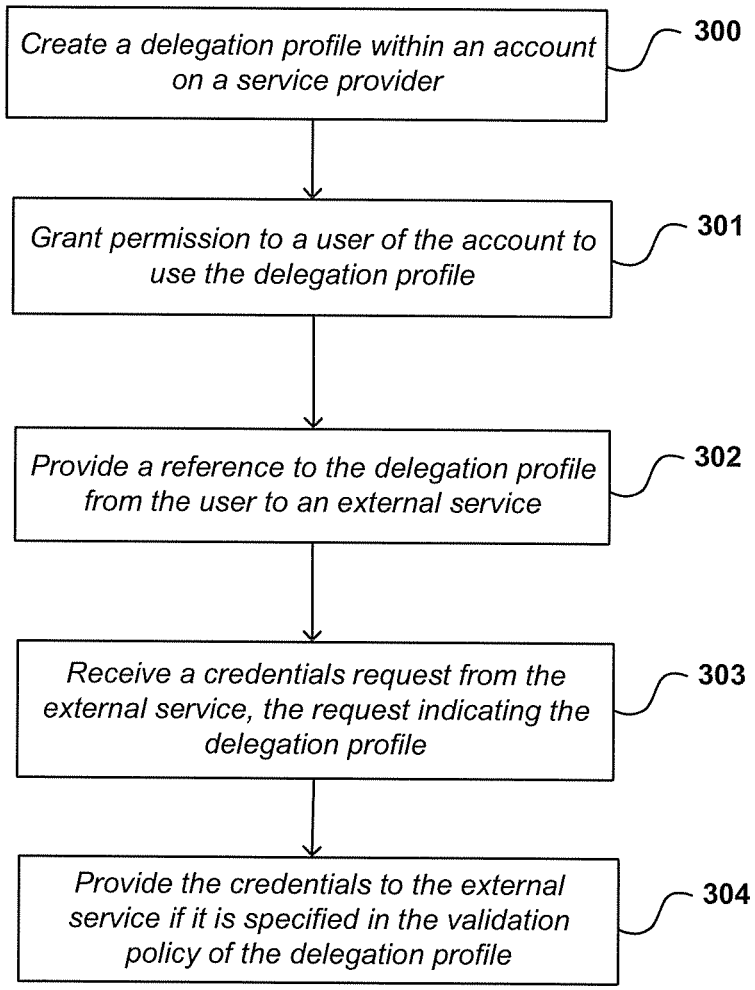
FIG. 3 illustrates an example process for using an entity to delegate permissions, in accordance with various embodiments.

FIG. 3 illustrates an example process for using an entity to delegate permissions, in accordance with various embodiments. Although this figure, as well as any other process illustrations contained in this disclosure may depict functional operations in a particular sequence, the processes are not necessarily limited to the particular order or operations illustrated. One skilled in the art will appreciate that the various operations portrayed in this or other figures can be changed, rearranged, performed in parallel or adapted in various ways. Furthermore, it is to be understood that certain operations or sequences of operations can be added to or omitted from the process, without departing from the scope of the various embodiments.

As shown in operation 300, a delegation profile is created in an account of a service provider. For example, an account administrator that manages a customer's account on a service provider may create the delegation profile. The delegation profile can specify a name, a security principal that will be allowed to assume the delegation profile, and a set of actions that the security principal will be allowed to perform in the account.

In operation 301, an authorized user under the account is granted permission to use the delegation profile. For example, the administrator can enable one or more users of the account to provide the delegation profile to external entities so that they are able to access the account resources.

In operation 302, the authorized user may provide a reference to the delegation profile to an external service. The external service may reside on the service provider but outside of the account in which the delegation profile was created. Alternatively, the external service may reside outside of the service provider itself.

In operation 303, once the external service receives the reference to the delegation profile, it can submit a request for credentials to perform actions in the account. For example, the external service may submit the request to a security token service and the request may indicate the delegation profile.

In operation 304, the set of credentials can be issued to the external service if the external service was verified as having been designated a proper security principal in the validation policy of the delegation profile. These credentials can enable requests to be made within the context of an identity within the account, wherein the permissions granted to the service are based on the capabilities specified in the delegation profile.

Figure 4:
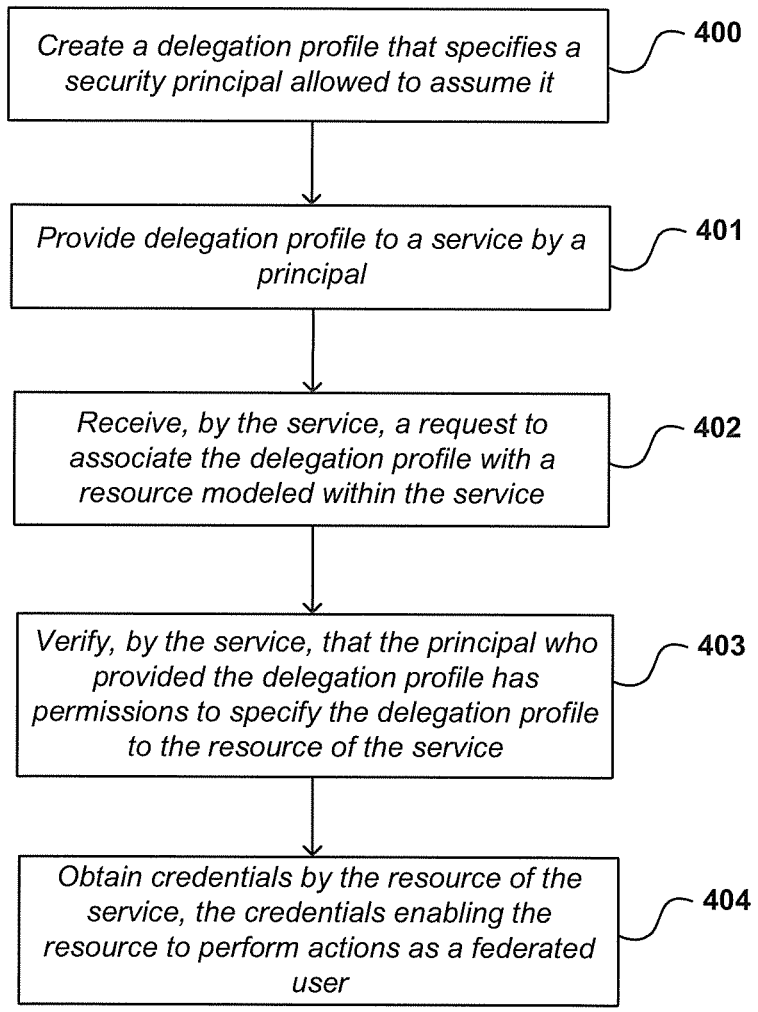
FIG. 4 is an example process for enabling resources modeled within a service to utilize a delegation profile, in accordance with various embodiments.

FIG. 4 is an example process for enabling resources modeled within a service to utilize a delegation profile, in accordance with various embodiments. As shown in operation 400, a delegation profile is created. The delegation profile specifies the one or more principals that are allowed to assume it (act under the profile). In some embodiments, the delegation profile further specifies which actions those principals are allowed to perform while acting under the profile.

In operation 401, the delegation profile is provided to a service, such as by sending to the service a request including a reference to the delegation profile. In operation 402, the service receives the request to associate the delegation profile with a resource that is modeled within the service. For example, the resource may be any component or portion of the service that may need access to the account in which the delegation profile was created.

In operation 403, the service can verify that the principal who provided the delegation profile to it has the permissions to specify (i.e. use) the delegation profile to the resource of the service. This can be performed by checking the permissions or other security information that are associated with the principal on the service itself.

In operation 404, the resource of the service can obtain the credentials that will enable it to perform actions in the account in which the delegation profile was created. For example, the service may obtain the credentials on behalf of the resource modeled within it by invoking a security token service or an identity management service.

As discussed, in other embodiments an end user or other external entity might not be given a reference to a particular delegation profile, but the delegation profile might be determined dynamically in response to, for example, a request being received from a device associated with the end user, where the request requires access to at least one secured resource in a resource provider environment. Referring back to FIG. 1, a customer 124 might be a developer of an application that can be executed on a computing device associated with an end user 116. The customer 124 might have an account with the resource provider environment 102, whereby information can be stored and/or processed for the application, or users of the application, using one or more resources 104 in the environment. When a copy of the customer application is stored and executed on the computing device of a user 116, that application might send a request to the resource provider environment 102 in order to access one of the resources associated with the customer account, in order to obtain information or perform a task associated with the application. In some embodiments, this can include tasks such as adding a score to a leader board, processing data to obtain a result for presentation via the application, and the like.

It may be the case that the developer of the application, the customer 124 in this example, does not want to be responsible for configuring and managing an identity store for the various end users of the application. As discussed, in such situations the customer might want to utilize an identity service 118, federation service, or other such security service in order to manage the user identity information on the customer's behalf. The end user in such an example can provide identifying information, such as a username and password or other such information, to an identity service 118 with which the end user might have an account, profile, or other such relationship. In some embodiments, the identity service might be offered through the resource provider environment 102. The identity service can authenticate the user based at least in part upon the provided information, and then can vouch for the identity of the user. In some embodiments as discussed previously the identity service can provide credentials 122 (e.g., a secure token) to the user to be submitted with any request to the resource provider system 102 and/or customer 124, in order to prove the identity of the user associated with the request. In other embodiments, the identity service might receive requests for authentication information when a request for an end user is received to either the resource provider environment 102 or the customer 124, in which case the identity service will have to provide information indicating whether or not the request is actually associated with the user purported to be associated with the request based at least in part upon information associated with the request.

Since the application developer will generally be financially responsible for those resources 104 associated with the developer's account, the developer may want the ability to control, manage, or specify at least a portion of the tasks that the users can perform using resources associated with to the developer's account. This can be especially true when the developer might not have a directly relationship with many of the end users, where those relationships are established through the identity service or another such third party that is vouching for the identity of the end users. The resource provider environment thus can provide mechanisms that enable the developer and other customers to limit access and risk, rather than simply providing each end user with unlimited access to the resources associated with the developer.

Approaches in accordance with various embodiments provide mechanisms by which transitive trust from an end user or other external entity can be established through a third party to a customer and a resource provider. In one example, an end user might log into a social networking site that provides identity management. The end user can be assigned an identifier that is used to identify that user to entities associated with the social networking site. An application developer might provide an application that can be downloaded and executed by end users who have accounts with the social networking site. As discussed, the application might utilize resources that are associated with the developer but offered as part of a service provider system or environment. In order to enable the end users to obtain access to those resources, but manage the amount or type of access that can be obtained, the developer can create one or more policies that enable third-party authenticated end users to access at least a portion of those resources, such as by uploading data to a storage instance path that starts with, or includes, the identifier for the user. Such an approach ensures that customers do not interfere with each other's data, as there can be a naming prefix based at least in part upon each end user identity. A given resource thus can be logically separated into regions or portions that correspond to particular user identifiers, and the regions or portions can be restricted from access by other users or portions, etc.

Further, the developer might want to restrict the actions that can be taken by those end users with respect to a particular resource. For example, the developer might enable users to upload and view high scores for a gaming application, but might not want to allow any users coming through the third party identity service to launch or delete instances of specific resources. The developer thus can limit access to various tasks or subsets of resources within a service, for example, where the specific tasks or subsets can depend at least in part upon the identity of the user, as well as the source of authentication for that user. A customer can perform any task allowed by the provider of the resource under the customer account, and the customer can determine which types or subsets of those tasks to delegate to an end user. In some embodiments, the delegations might include the individual user identities such that an end user might be allowed to perform an action such as to launch an instance, but only where the instance has a hostname equal to, or based at least in part on, the user identifier. Such an approach thus enables a customer to delegate additional permissions, but only against portions of the resources having context associated with the third party identifier. The context also might include information in addition to the user identity. For example, an identity provider might provide a physical address for a user, where the geographic location might be a determining factor in the type of access granted.

In some embodiments a customer might want to allow end users to access the customer's allocated resources, but might not want to be responsible for an unlimited amount of usage.

A customer might then specify one or more quotas on the amount of usage by some or all end users. For example, a customer might specify that each end user verified by a particular identity service can consume up to $0.35 of resources, and/or the total amount of consumption by users verified by that identity service can be capped at a dollar amount, number of requests, volume of usage, or other such metric.

Figure 5:
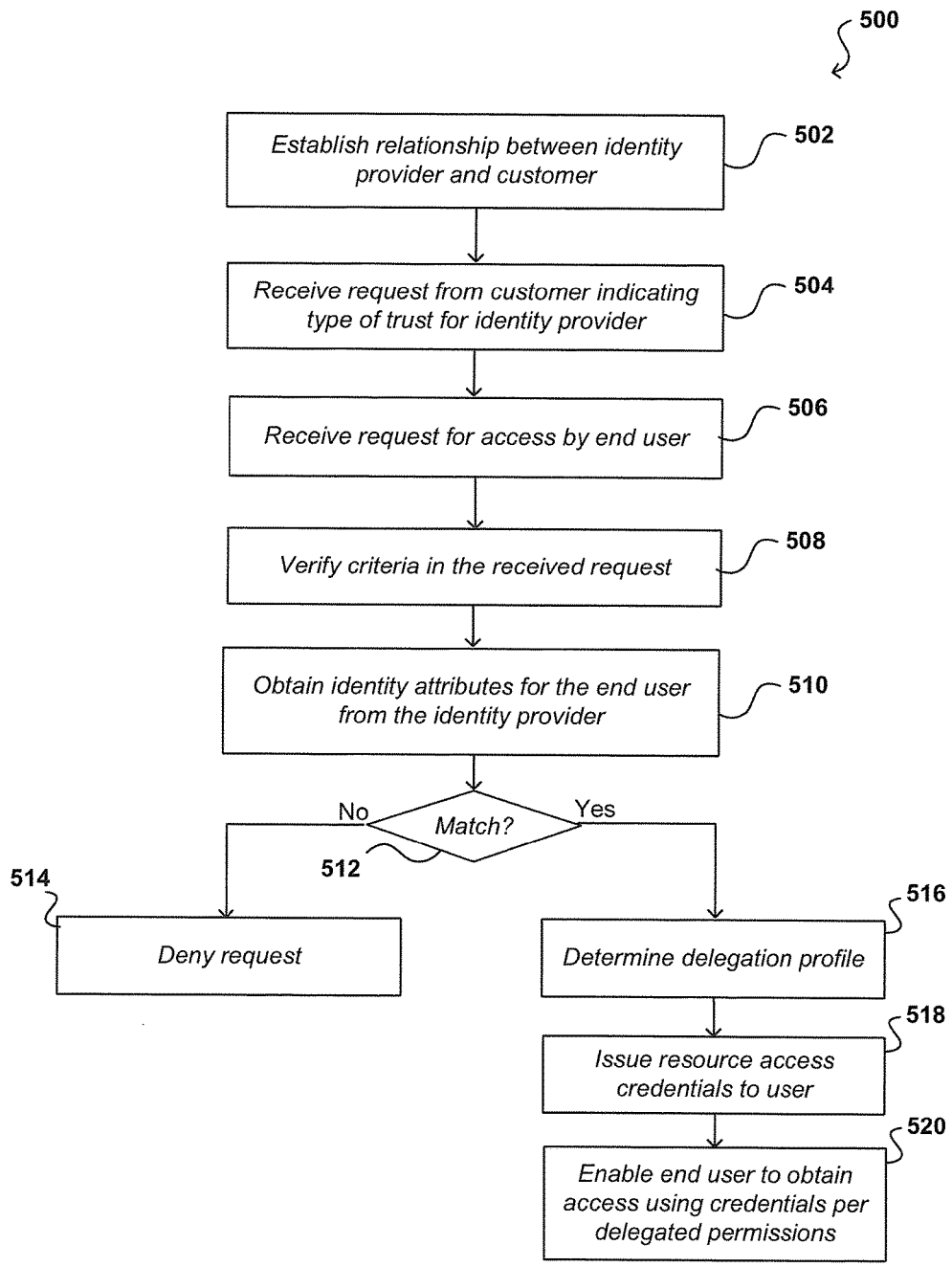
FIG. 5 is an example process for determining a delegation profile to apply to a request in accordance with various embodiments.

FIG. 5 illustrates an example process 500 that can be used to enable a customer to delegate access to one or more resources in accordance with various embodiments. In this example, a relationship can be established 502 between an identity provider and a customer of a multi-tenant environment, with a relationship also being established between the identity provider and a group of end users. A request can be received 504 from the customer to indicate that the identity provider is trusted to assert certain things about end users to resources allocated to the customer in the multi-tenant environment, as may include identity and location information, as well as information about the type of user or other such aspects. The customer in some embodiments can setup rules to define the set of federation providers to be trusted for the customer account, whereby a provider must comply with the rules to be trusted by the multi-tenant environment. An example of a rule could be that the provider complies with a determined information format, has a minimum number of customers, and supports a specified type of identity verification. Such an approach provides for a criteria-based vetting of identity providers, instead of requiring the providers to be specifically indicated by name or other identifier.

Once the access is enabled, a request can be received 506 from an end user for access to at least a portion of the customer's resources in the multi-tenant environment. The multi-tenant environment can verify 508 criteria in the received request and use the criteria to obtain 510 identity attributes for the end user from the identity provider. The obtaining can be performed by, for example, requesting the information from the identity provider or examining a cryptographic token included with the request, among other such options. The attributes can be used to verify that the user identity information is correct and signed by the identity provider. A determination can be made 512 as to whether the information matches. If not, the request can be denied 514. If the information matches or the user is otherwise authenticated, one or more delegation profiles 516 can be determined based at least in part upon the information for the user, the customer account for the resources to be used in providing access, and other such information. One or more access credentials then can be issued 518 to the end user, where those credentials are scoped by the determined delegation policy or other permissions that were previously expressed by the customer to apply to the type of request. The issuance of the access credentials enables 520 the end user to obtain direct access to at least some resources allocated to the customer, as determined by the determined delegation policy.

In some embodiments, one or more rules can be evaluated to determine a set of policies indicating whether to apply a delegation profile, as well as the proper delegation profile to apply. The rules can take the form of code that is evaluated in the context of the permissions to determine the appropriate policy, could involve simple declarative rules with support for conditional statements, or could utilize variable substitution, among other such options.

In some embodiments, a set of templates can be used to allow mapping between the incoming identity and the outgoing permissions. An example template can allow access to a specified link (e.g., a URL for a storage resource), where that link might include an identifier or variable that corresponds to the user. Such an approach can provide directory-like semantics, where a user data directory can be provided on top of a user-specific subfolder for each user who has used that directory. This can be expressed in a single document that gets the replacement of the variable whenever a user attempts to obtain access.

Instead of (or in addition to) templates, another approach can be based at least in part upon a set of rules such as those discussed above. Other approaches to performing the mapping can be used as well, where the set of information provided by the third party identity service is accepted as input, potentially filtered by what the customer decides to trust. In some cases there might be certain identity information that is mandatory. There might also be information about the customer obtained from the resource provider environment, particularly when the appropriate customer was auto-detected. The information might also include additional metadata as set by the customer, among other such options.

The various information and attributes from the various sources can, in at least some embodiments, be run through a rules engine that can output a document with one or more policies dictating what the user is allowed to do against the resources allocated to the respective customer. The rules engine might also be operable to manipulate other resources in the course of making that determination, such as reading or writing information to a data store for purposes such as quota maintenance or mapping updates, etc. In some embodiments a new identifier can be associated with an entity that has not previously been encountered, and the identifier can be an additional output of an example mapping process. The output thus can include at least a credential that allows the end user to access at least a portion of the customer allocated resources, the permissions that define what the end user can do with that access, and optionally some metadata that goes back to the customer or is stored by the resources.

At least some embodiments might also utilize a generic output step as a way of facilitating quota maintenance. This might include a second set of rules that are run after the credentials and permissions are determined and provided for a particular end user. These can cause quota data to be stored or updated, or other such information to be written, and in some embodiments might even cause additional instances to be provisioned.

In some cases an end user might be associated with several customers, such as where the end user has downloaded apps from multiple developers onto a single computing device. Thus, when a request for access is received from an end user that contains identifying information from a third party identity service, it can be necessary to determine the appropriate customer account to which to provide access for the specific request. For example, it can be necessary to determine which application is associated with the request, and which customer is associated with that application, in order to determine which permissions to provide so the application can only access resources for the respective customer.

As mentioned previously, requests can in some embodiments include an identification of the appropriate delegation profile to use. When the delegation profile is not identified, the system must determine the appropriate profile to use based on other information in, or associated with, the request. In an embodiment, an authentication mechanism such as PKI (Public Key Infrastructure) or SAML (security assertion markup language) might be used to assert claims with respect to the identity of an end user. The certificate used to sign the request for one of these mechanisms can be associated with a particular delegation profile, and thus used as an indication of the appropriate delegation profile. After the information provided with the request is verified, various rules can be used to determine the appropriate account and security principle within that account to be assigned, while in other embodiments the account and principal can be claimed as part of the request. Various other such approaches can be used as well. The appropriate principal can be previously designated by the customer, such that any end user who comes in with a claim signed by the appropriate public certificate, provided by the customer, has a specified profile applied. In some embodiments, the requests might include an identifier for the desired profile, and the users can obtain access per that profile when the mapping indicates that the profile is mapped to that end user. In some embodiments, a single profile might be able to be associated with a particular public certificate, such that the end user is limited to the profile associated with the certificate.

In some embodiments, a request might be received that is not associated with a third party identity service, but with an identity service associated with the resource provider environment. If the system can unambiguously determine that the end user is associated with the resource provider environment, the appropriate delegation profile can automatically be attached to the end user request. Certain customers might want such a request to be able to obtain a full delegation of rights, subject to any applied restrictions.

In another example embodiment, a wildcard domain name service (DNS) could be operated for a token acceptance endpoint in accordance with various federation protocols. Such an approach can enable a customer to use a unique end point to receive the token, enabling most protocols to be disambiguated. Many federation protocols include an indication of where the credential is being delivered, so if a multi-tenant federation gateway is included that can provide a of DNS endpoints, the system can provide full disambiguation.

Figure 6:
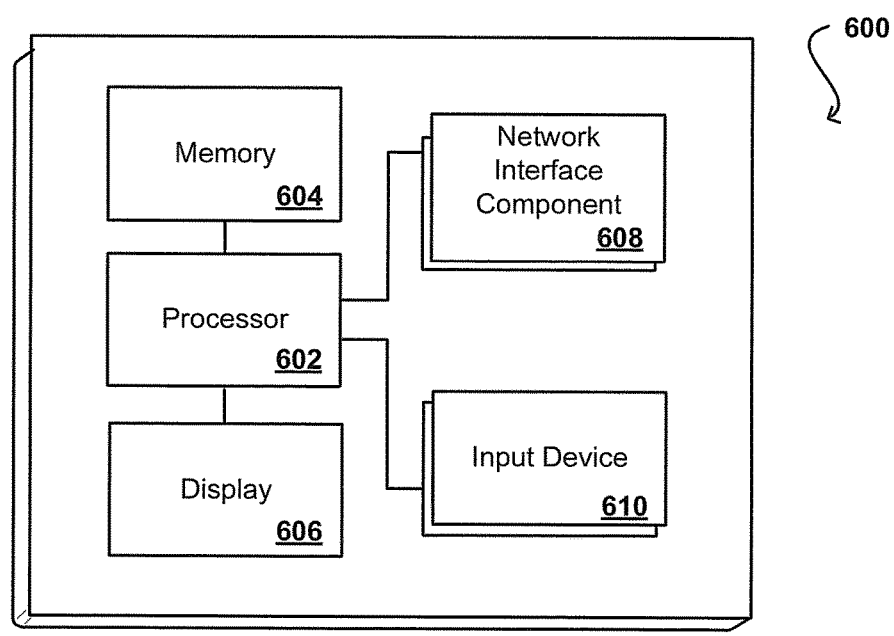
FIG. 6 illustrates a logical arrangement of a set of general components of an example computing device, in accordance with various embodiments.

FIG. 6 illustrates a logical arrangement of a set of general components of an example computing device 600. In this example, the device includes a processor 602 for executing instructions that can be stored in a memory device or element 604. As would be apparent to one of ordinary skill in the art, the device can include many types of memory, data storage, or non-transitory computer-readable storage media, such as a first data storage for program instructions for execution by the processor 602, a separate storage for images or data, a removable memory for sharing information with other devices, etc. The device typically will include some type of display element 606, such as a touch screen or liquid crystal display (LCD), although devices such as portable media players might convey information via other means, such as through audio speakers. The device can include one or more network interface components 608 configured to enable the device to transmit and receive information over a network. As discussed, the device in many embodiments will include at least one input element 610 able to receive conventional input from a user. This conventional input can include, for example, a push button, touch pad, touch screen, wheel, joystick, keyboard, mouse, keypad, or any other such device or element whereby a user can input a command to the device. In some embodiments, however, such a device might not include any buttons at all, and might be controlled only through a combination of visual and audio commands, such that a user can control the device without having to be in contact with the device. In some embodiments, the computing device 600 of FIG. 6 can include one or more network interface elements 608 for communicating over various networks, such as a Wi-Fi, Bluetooth, RF, wired, or wireless communication systems. The device in many embodiments can communicate with a network, such as the Internet, and may be able to communicate with other such devices.

Figure 7:
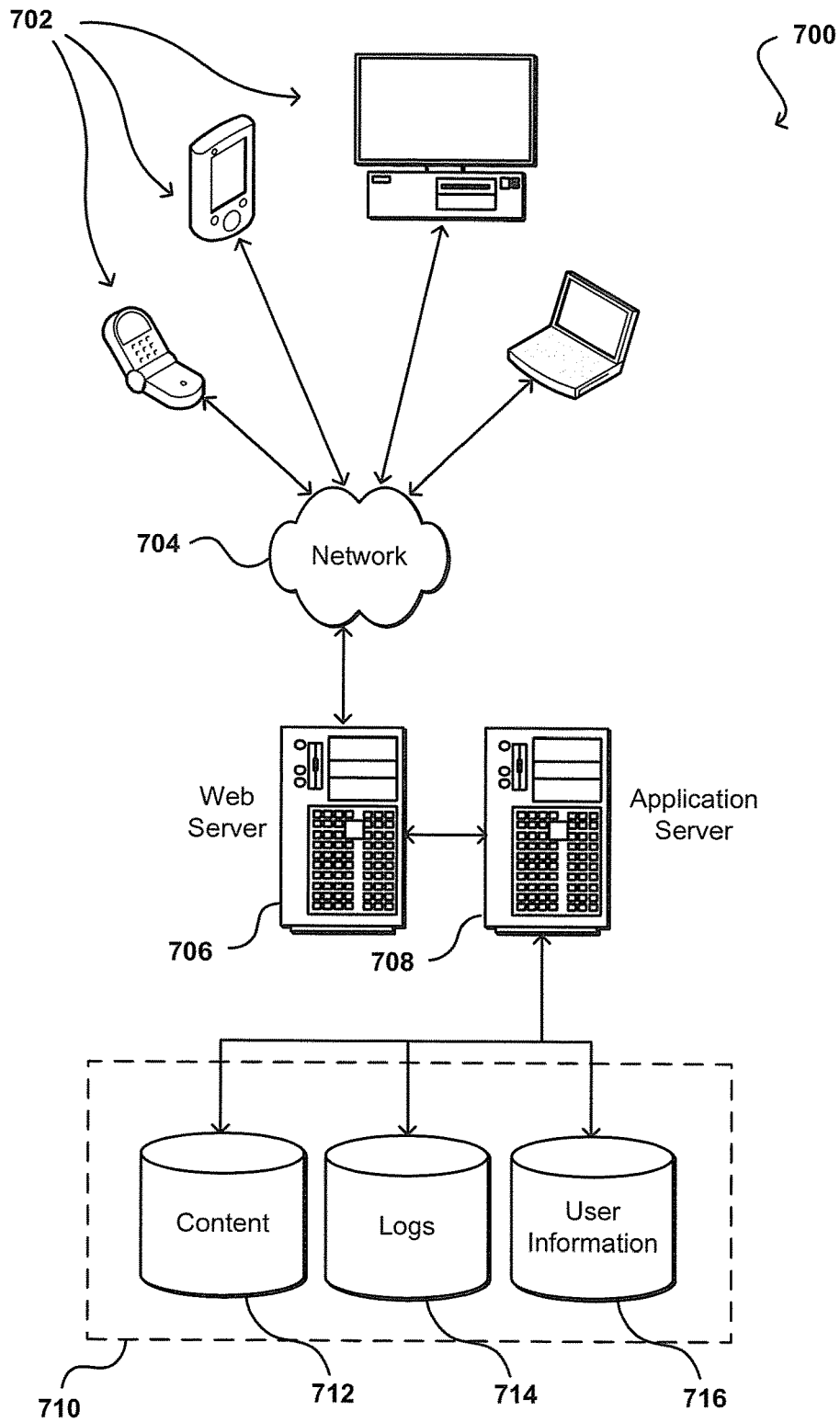
FIG. 7 illustrates an example of an environment for implementing aspects in accordance with various embodiments.

As discussed, different approaches can be implemented in various environments in accordance with the described embodiments. For example, FIG. 7 illustrates an example of an environment 700 for implementing aspects in accordance with various embodiments. As will be appreciated, although a Web-based environment is used for purposes of explanation, different environments may be used, as appropriate, to implement various embodiments. The system includes an electronic client device 702, which can include any appropriate device operable to send and receive requests, messages or information over an appropriate network 704 and convey information back to a user of the device. Examples of such client devices include personal computers, cell phones, handheld messaging devices, laptop computers, set-top boxes, personal data assistants, electronic book readers and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled via wired or wireless connections and combinations thereof. In this example, the network includes the Internet, as the environment includes a Web server 706 for receiving requests and serving content in response thereto, although for other networks an alternative device serving a similar purpose could be used, as would be apparent to one of ordinary skill in the art.

The illustrative environment includes at least one application server 708 and a data store 710. It should be understood that there can be several application servers, layers or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device and handling a majority of the data access and business logic for an application. The application server provides access control services in cooperation with the data store and is able to generate content such as text, graphics, audio and/or video to be transferred to the user, which may be served to the user by the Web server in the form of HTML, XML or another appropriate structured language in this example. The handling of all requests and responses, as well as the delivery of content between the client device 702 and the application server 708, can be handled by the Web server 706. It should be understood that the Web and application servers are not required and are merely example components, as structured code discussed herein can be executed on any appropriate device or host machine as discussed elsewhere herein.

The data store 710 can include several separate data tables, databases or other data storage mechanisms and media for storing data relating to a particular aspect. For example, the data store illustrated includes mechanisms for storing production data 712 and user information 716, which can be used to serve content for the production side. The data store also is shown to include a mechanism for storing log data 714. It should be understood that there can be many other aspects that may need to be stored in the data store, such as page image information and access rights information, which can be stored in any of the above listed mechanisms as appropriate or in additional mechanisms in the data store 710. The data store 710 is operable, through logic associated therewith, to receive instructions from the application server 708 and obtain, update or otherwise process data in response thereto. In one example, a user might submit a search request for a certain type of item. In this case, the data store might access the user information to verify the identity of the user and can access the catalog detail information to obtain information about items of that type. The information can then be returned to the user, such as in a results listing on a Web page that the user is able to view via a browser on the user device 702. Information for a particular item of interest can be viewed in a dedicated page or window of the browser.

Each server typically will include an operating system that provides executable program instructions for the general administration and operation of that server and typically will include computer-readable medium storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 7. Thus, the depiction of the system 700 in FIG. 7 should be taken as being illustrative in nature and not limiting to the scope of the disclosure.

Various embodiments discussed or suggested herein can be implemented in a wide variety of operating environments, which in some cases can include one or more user computers, computing devices, or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as TCP/IP, OSI, FTP, UPnP, NFS, CIFS, and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including HTTP servers, FTP servers, CGI servers, data servers, Java servers, and business application servers. The server(s) also may be capable of executing programs or scripts in response requests from user devices, such as by executing one or more Web applications that may be implemented as one or more scripts or programs written in any programming language, such as Java®, C, C# or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit (CPU), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, EEPROM, flash memory or other memory technology, CD-ROM, digital versatile disk (DVD) or other optical storage, magnetic cassettes, magnetic tape, magnetic disk storage or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the invention as set forth in the claims.

What is claimed is:

1. A computer implemented method, comprising: receiving, by one or more computing devices, from an entity, a request for access to one or more resources associated with an account of a customer, the account being maintained by a provider of the one or more resources, the one or more resources accessible to the customer as determined by one or more terms of the account; determining, by the one or more computing devices, a delegation profile specified by the request, the delegation profile being associated with the account of the customer, the delegation profile associated with one or more permissions for accessing and utilizing the one or more resources, the one or more permissions being assigned according to one or more rules; passing at least a portion of the identity information and information associated with the applicable delegation profile through at least one rules engine in order to determine the one or more permissions, the one or more permissions indicating one or more actions the entity is permitted to perform against the one or more resources under the account of the customer; determining, according to a validation policy indicated by the delegation profile, that the entity is authorized to perform one or more actions against the one or more resources as specified by the delegation profile, wherein determining that the entity is authorized comprises obtaining identity information for the entity from an identity provider, and determining that the identity information corresponds to an entity specified in the validation policy; and providing, by the one or more computing devices, the entity with access to the one or more resources according to the one or more permissions associated with the delegation profile, the access enabling the entity to act as the customer on the one or more resources subject to the one or more permissions.

2. The computer-implemented method of claim 1, wherein the entity is provided with access only when the identity provider is a federation provider indicated by the delegation profile, or when the identity information provided by the identity provider includes at least one piece of mandatory information.

3. The computer-implemented method of claim 1, wherein the identity information includes a security token issued by the identity provider associated with the delegation profile.

4. The computer-implemented method of claim 1, further comprising: receiving, from the entity, a request to transfer data to a resource of the one or more resources; and creating a storage instance path for the data, a name of the storage instance path including an identifier associated with the entity.

5. The computer-implemented method of claim 1, further comprising: creating a link providing access to a resource of the one or more resources, a portion of the link including an identifier corresponding to the entity.

6. The computer-implemented method of claim 1, wherein the one or more rules map attributes asserted by an identity authority to one or more permissions elements.

7. The computer-implemented method of claim 1, wherein determining the delegation profile further comprises: determining whether the request is signed by a key associated with the customer, directed to an endpoint associated by the customer, or directed to a location identified at least in part using identifying information for the entity.

8. The computer-implemented method of claim 1, further comprising: denying the entity access to the one or more resources based at least in part upon quota information for at least one of the entity or the provider.

9. The computer-implemented method of claim 1, wherein the customer is a developer of an application, and wherein the entity is an end user or device operated by the end user running a copy of the application.

10. The computer-implemented method of claim 1, wherein the permissions of the applicable delegation profile are restricted to a scope that is less than or equal to permissions of the customer on the account.

11. A computer system, comprising: at least one processor; and memory including instructions that, when executed by the at least one processor, cause the computer system to: receive, by one or more computing devices, from an entity, a request for access to one or more resources associated with an account of a customer, the account being maintained by a provider of the one or more resources, the one or more resources accessible to the customer as determined by one or more terms of the account; determine, by the one or more computing devices, a delegation profile specified by the request, the delegation profile being associated with the account of the customer, the delegation profile associated with one or more permissions for accessing and utilizing the one or more resources, the one or more permissions being assigned according to one or more rules; passing at least a portion of the identity information and information associated with the applicable delegation profile through at least one rules engine in order to determine the one or more permissions, the one or more permissions indicating one or more actions the entity is permitted to perform against the one or more resources under the account of the customer; determine, according to a validation policy indicated by the delegation profile, that the entity is authorized to perform one or more actions against the one or more resources as specified by the delegation profile, wherein determining that the entity is authorized comprises obtaining identity information for the entity from an identity provider, and determining that the identity information corresponds to an entity specified in the validation policy; and provide, by the one or more computing devices, the entity with access to the one or more resources according to the one or more permissions associated with the delegation profile, the access enabling the entity to act as the customer on the one or more resources subject to the one or more permissions.

12. The computer system of claim 11, wherein the entity is provided with access only when the identity provider is a federation provider indicated by the delegation profile, or when the identity information provided by the identity provider includes at least one piece of mandatory information.

13. The computer system of claim 11, wherein the one or more rules map attributes asserted by an identity authority to one or more permissions elements.

14. A non-transitory computer-readable storage medium including instructions that, when executed by at least one processor of a computing system, cause the computing system to: receive, by one or more computing devices, from an entity, a request for access to one or more resources associated with an account of a customer, the account being maintained by a provider of the one or more resources, the one or more resources accessible to the customer as determined by one or more terms of the account; determine, by the one or more computing devices, a delegation profile specified by the request, the delegation profile being associated with the account of the customer, the applicable delegation profile associated with one or more permissions for accessing and utilizing the one or more resources, the one or more permissions being assigned according to one or more rules; passing at least a portion of the identity information and information associated with the applicable delegation profile through at least one rules engine in order to determine the one or more permissions, the one or more permissions indicating one or more actions the entity is permitted to perform against the one or more resources under the account of the customer; determine, according to a validation policy indicated by the delegation profile, that the entity is authorized to perform one or more actions against the one or more resources as specified by the delegation profile, wherein determining that the entity is authorized comprises obtaining identity information for the entity from an identity provider, and determining that the identity information corresponds to an entity specified in the validation policy; and provide, by the one or more computing devices, the entity with access to the one or more resources according to the one or more permissions associated with the applicable delegation profile, the access enabling the entity to act as the customer on the one or more resources subject to the one or more permissions.

15. The non-transitory computer-readable storage medium of claim 14, wherein the customer is a developer of an application, and wherein the entity is an end user or device operated by the end user running a copy of the application.

* * * * *